United States Patent Office 3,796,678
Patented Mar. 12, 1974

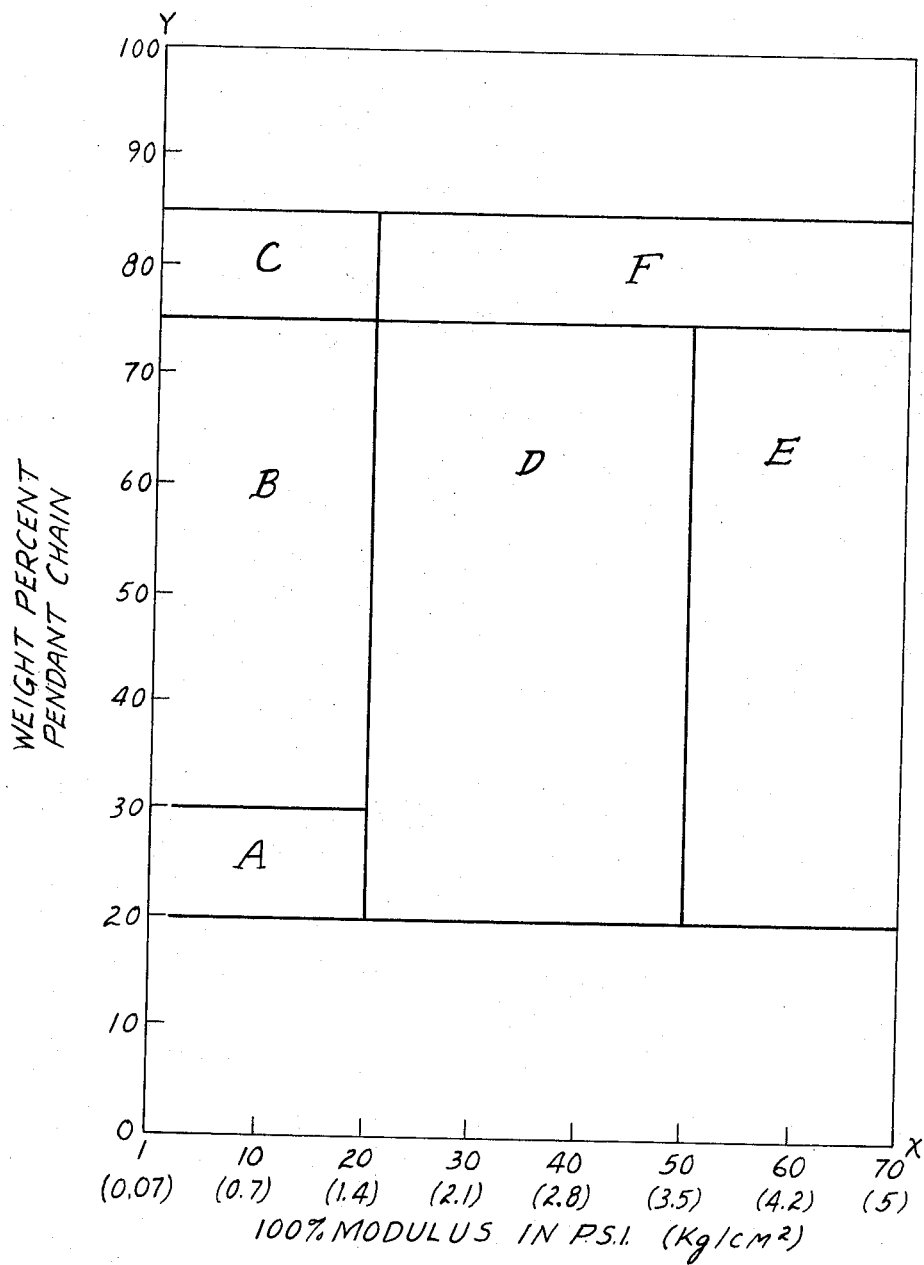

3,796,678
HIGHLY BRANCHED, CAPPED POLYURETHANES FOR PRESSURE SENSITIVE ADHESIVES
Dennis C. Bartizal, St. Paul, Minn., assignor to Minnesota Mining and Manufacturing Company, St. Paul, Minn.
Filed Aug. 17, 1970, Ser. No. 64,270
Int. Cl. C08g 22/08, 51/24; C09j 7/00
U.S. Cl. 260—29.2 TN                    21 Claims

ABSTRACT OF THE DISCLOSURE

The disclosed prepolymers contain at least about 20 weight percent pendant chains, and, when chain extended, form polyurethane, polyurethane-polyurea, or polyurea polymers, also having at least about 20 weight percent pendant chains. These polymers are formed in and/or dissolved or dispersed in liquid media to provide liquid adhesive systems, e.g. aqueous latex adhesive systems. Such systems, upon evaporation of the liquid phase, provide a film or coating with pressure-sensitive adhesive properties. These films exert a tensile stress of less than about 70 p.s.i. at 100% elongation.

---

This invention relates to polyurethane, polyurethane-polyurea, or polyurea polymers, dispersed or otherwise distributed throughout a liquid phase, which, upon evaporation of the liquid under ambient conditions provide solid films or coatings with pressure-sensitive adhesive properties. An aspect of this invention relates to aqueous latices containing the aforementioned polymers in dispersed form. Another aspect of this invention relates to prepolymers suitable for forming the aforementioned polymers and latices. A further aspect of this invention relates to liquid adhesive systems containing the aforementioned polymers in an organic liquid phase.

There are a wide variety of uses for stable liquid adhesive systems which can be stored in a suitable container, dispensed when desired, and dried to provide a solid pressure-sensitive adhesive film or other solid, adhesive mass. A suitable container could be a can or shipping drum or, for convenient dispensing, a plastic squeeze bottle, aerosol dispenser, or the like. Such storage or dispensing can be achieved with a system comprising adhesive solids in a liquid carrier or phase (i.e. dissolving and/or suspending or dispersing medium) capable of drying to form a pressure-sensitive adhesive film or layer. Low viscosity liquid systems have been made and stored by dissolving and/or suspending appropriately selected adhesive solids (e.g. a conventional rubber-tackifier resin composition or an inherently tacky acrylate composition) in an organic liquid carrier or solvent such as toluene, heptane, etc. These organic liquids have properties which make their use inconvenient or hazardous under ordinary conditions, e.g. flammability. Furthermore, not all tacky solids can be conveniently dispersed or dissolved in liquid media. For example, the highly crosslinked tacky polyurethane solids or semi-solids described in British specification No. 1,113,925, published May 15, 1968, are not intended or designed for bulk packaging and are preferably formed in situ from liquid or dissolved reactants (e.g. a polyisocyanate and a poly[oxyalkylene]polyol) on a substrate. See also French Pats. 1,447,017 and 1,565,259, published June 13, 1966 and Mar. 17, 1969, respectively.

It is well known that film-forming aqueous latices can be made from polyurethane elastomers; see, for example, U. S. Pats. 3,401,133 (Grace et al.), issued September 1968, 3,479,310 (Dietrich et al.), issued November 1969, and 3,480,592 (Dietrich et al.), issued November 1969. If a polyurethane latex could be made such that a coating therefrom would be tacky over a wide range of temperatures even in the absence of heat, moisture, and external agents such as tackifiers and plasticizers, a conveniently storable, non-toxic, non-flammable, pressure-sensitive adhesive system would thereby be provided. However, there are no guidelines in the prior art for (or even suggestions relating to) obtaining such tackiness. In fact, a dried coating or film derived from any of the prior art polyurethane latices tends to be either marginally tacky at best or, if tacky, lacking in internal strength or the ability to provide good adhesive bond strength.

The prior art also does not suggest how a solid, polyurethane-type polymer could be made to provide good adhesive bond strength and tackiness and internal strength and still be soluble or dispersible in organic carrier systems. It would, in fact, be expected that the making of a polyurethane-type polymer which satisfies all these criteria would be anything but straightforward.

Accordingly, this invention contemplates providing certain specific polyurethane, polyurethane-polyurea, or polyurea prepolymers and polymers and latices, or other liquid systems, derived therefrom, the latices or liquid systems being capable of forming a pressure-sensitive adhesive layer or film or other solid adhesive mass having good peel strength.

This invention also contemplates a film-forming aqueous latex system capable of providing good adhesive properties (tack, internal strength, adhesive bond strength, and the like) and which is free of the hazards and inconveniences associated with organic carrier or solvent-based systems.

This invention further contemplates providing polyurethane, polyurethane-polyurea, and polyurea prepolymers and polymers derived therefrom by chain-extension in an organic liquid medium to provide a stable solution of solid polymer with good pressure-sensitive adhesive capabilities.

This invention further contemplates polyurethane, polyurethane-polyurea, and polyurea prepolymers and polymers derived therefrom, which polymers are capable of forming pressure-sensitive film or coatings from liquid dispersing or dissolving media, which films can be treated to alter or increase their adhesive properties, or increase their internal strength.

This invention further contemplates aqueous latex systems with pressure-sensitive adhesive and self-thickening capabilities and/or which comprise unusually small latex particles.

Briefly, this invention relates to polyurethane, polyurethane-polyurea, or polyurea prepolymers and polymers and pourable media derived therefrom, the pourable media preferably being latices of the oil-in-water type which are capable of serving as an adhesive system, e.g. by drying to form pressure-sensitive adhesive films. These latices contain self-tackified or self-tackifiable particulate polymeric latex solids dispersed in a continuous aqueous phase wherein the polymer used to make the latex solids has at least about 20%, preferably more than 30%, by weight pendant chains. When the latex solids are dried under ambient conditions to a coherent film, the film exerts a tensile stress of less than about 70 p.s.i. (about 5 kg./cm.$^2$) preferably less than 50 p.s.i. (3.5 kg./cm.$^2$) at 100% elongation. The stress at 100% elongation will, for convenience, be hereinafter referred to as the "100% modulus." Preferably the 100% modulus is greater than about 1.0 p.s.i. (.07 kg./cm.$^2$). The term "pendant chain" is defined hereinafter. Such "pendant chains" are obtained by including in the polymer starting materials a material, preferably a significant amount of a prepolymer, with at least three —NCO functions or active hydrogen bearing functional groups. The amount of the tri- or higher functionality prepolymer is sufficient to provide the prepolymer starting material (if it is a mixture) with an average functionality of $\geq 2.5$. The pendant chain-producing feature of this prepolymer starting material is that at least equivalent of its —NCO functions or active hydrogen bearing groups are rendered inert to interaction with a chain-propagating co-reactant, but at least enough equivalents are capable of such interaction to provide linear chain extension. For example, the prepolymer can have an average —NCO functionality of 3.0 and 0.5 equivalent of the —NCO functions can be blocked or capped with a monofunctional alcohol to yield an —NH—CO—OR terminal group, thus rendering the capped —NCO's inert to further reaction with water, diols, diamines or the like. In this instance an average —NCO functionality of 2.5 would remain unreacted and available for chain propagation (the NCO/active-hydrogen reaction), the resulting chain propagation being linear chain extension accompanied by a small amount of crosslinking. If the prepolymer is simultaneously chain extended and emulsified in an aqueous medium, the crosslink density of the resulting dispersed polymer should be less than one crosslink per 4000 theoretical polymer atomic mass units; if chain extension is carried out in a substantially organic liquid medium, the crosslinking density should be sufficiently below this value (one per 4,000) to obviate the formation of a permanently insoluble and non-dispersible gelled polymer. Thus, chain propagation in organic liquid media should be as nearly linear as possible, consistent with other objectives of this invention such as good internal strength of the adhesive solids, etc.

The term "active hydrogen" as used herein is defined in accordance with the Zerewitinoff Test, J. Amer. Chem. Soc. 49, 3181 (1927).

It is also possible to provide self-tackified organic carrier-based pressure-sensitive adhesive systems, containing the above described adhesive solids, according to the teachings of this invention. Another feature of this invention is that aqueous latex systems can be self-thickening and/or unusually stable due to the very small size of the latex particles. Still another feature of this invention is that the aforementioned capping or blocking terminal groups can contain latent curable functional groups such as double bonds or lactam rings, thus permitting alteration of the 100% modulus by after treatment with heat, electromagnetic radiation, free radical initiators, or other crosslinking treatments.

The "100% modulus" property described previously can be reliably controlled by appropriate selections of starting materials for making the latex solids of this invention. Such selections must give due regard to the nature and amounts (relative and absolute) of chain-linked aromatic nuclei and recurring polyether and/or polyester units in the backbone and pendant chains of the resulting polymer. By "backbone" is meant the part of the polymer chain that the pendant chains are connected to. For example, a relatively large number of recurring polyether, i.e. polyoxyalkylene, units and a relatively small number of aromatic nuclei in the backbone can provide a very low 100% modulus. Due regard should also be given to the method of emulsifying the latex solids of this invention. Superior tackiness is achieved when a prepolymer is simultaneously chain extended and emulsified in water, the resulting polymer containing hydrophilic "self-emulsifying" substituents or polar functional groups, e.g. cation or anion-forming groups such as tertiary nitrogens, sulfonic acid (—$SO_3H$) substituents or salts thereof, etc.

The latex solids content is variable over a wide range provided the viscosity in kept within useful limits and the amount of water phase is sufficient to prevent inversion to a water-in-oil type emulsion. Thus, the amount of water should be sufficient to provide a latex containing less than about 70% by weight solids. High solids content (e.g. 60% by weight) is preferred for shipping and for quick drying, but a solids content as low as 5 or 10 weight percent is still convenient to use if very rapid drying is not necessary.

It is preferable that the latices of this invention be free of waxy or oily materials which have a tendency to reduce the tackines of the latex solids. For example, if the latex is not self-emulsified (i.e. does not contain emulsion-stabilizing polar groups built into the polymer structure), but relies at least in part on surfactants external to the ploymer to provide a stable dispersion, these surfactants are preferably the cationic or anionic types rather than the nonionic (e.g. the poly[oxyethylene]) type.

The invention can be better understood by referring to the drawing, which sets forth a graphic plot of weight percent pendant chains in the chain-extended, polyurethane-type polymer (y-axis) vs. the 100% modulus of a film formed from the polymer (x-axis). The 100% modulus (i.e. stress at 100% elongation) is expressed in p.s.i. with corresponding kg./cm.$^2$ values in parentheses. (All values at room temperature and 50% R.H.)

Referring more particularly to the drawing, the areas designated A–F encompass adhesive film-forming polymers of this invention with one or more pressure sensitive adhesive properties such as tackiness, internal strength, and good adhesive bond strength. If high internal strength is needed and relatively low tackiness can be tolerated, the film provided by polymers of area E can be very useful. The polymers of area D provide somewhat more tacky films wtihout undue sacrifice of internal strength and thus can have broad utility. The polymers of area B also have a good spectrum of properties including optimum tackiness and internal strength which is adequate for a wide variety of uses. This spectrum of properties can still be obtained, but with difficulty, with the polymers of areas A and C. For example, it can be inconvenient to work with the high functionality starting materials (as high as 8 or more) required for polymers of area C. Thus, the most preferred adhesive film-forming polymers of this invention fall into areas B and D, and it should be noted that usually high functionality starting materials are required for areas C and F, i.e. any area of the plot with a y-axis coordinate above 75 wt. percent.

The preferred storable liquid adhesive systems of this invention are dispersions in a non-solvent liquid such as water, mixtures of water and toluene, etc. However, organic liquid carriers can also be used. Solvent systems can be used if one of the non-self-emulsified prepolymers of this invention (described subsequently) is dissolved in an aprotic, organic polar solvent, e.g. the lower alkanones (acetone, methyl ethyl ketone, diethyl ketone, etc.), the more polar ethers (tetrahydrofuran, dioxane, etc.), the dialkyl sulfoxides, gammabutyrolactone, etc., and chain extended in solution with water, glycols, diamines, or the like. The resulting polymer has a molecular weight high enough to make it a solid, has at least 20 wt. percent pendant chains, and can form coherent, tacky films from dried coatings of the solution. These films have a 100% modulus of less than about 70 p.s.i. After chain extension, it is preferred that the solution of polymer be stabilized by adding a minor amount of monofunctional *protic* polar organic solvent, e.g. a lower alkanol such as methanol.

Non-solvent organic liquid (e.g. hexane) dispersions of polymeric solids of this invention will also form tacky films upon drying.

The solids content of these organic (solution or dispersion) systems can be as high as 60 weight percent, but is preferably less than 50 wt. percent for better stability. An advantage of using an organic liquid carrier is that the organic liquid can be selected such that it evaporates more rapidly than water. This advantage must be weighed against the disadvantages—the fire hazard of solvents, the sensitivity of a substrate to polar solvent attack, etc.

The latices of this invention can be made in a number of ways. The preferred method is to prepare a branched-chain low molecular weight prepolymer or mixture of prepolymers containing: repeating oxyalkylene and/or ester units; suitable pendant chains; —NH—CO—Z-linkages (wherein Z is the residue of an active-hydrogen-containing substituent or compound); self-emulsifying sites (e.g. hydrophilic groups chemically linked into the prepolymer structure); and reactive or polymerizable sites, e.g. free —NCO groups. This type of prepolymer and polymers derived therefrom are sometimes referred to as polyurethane-type materials, even though they can contain urea as well as, or in lieu of, urethane (carbamate) linkages. The polyurethane-type prepolymer is then added, with vigorous agitation, to an aqueous medium, which medium can, if desired, contain a suitable polyamine chain-extender and/or a salt forming compound reactive with the self-emulsifying sites, and the prepolymer is chain extended and emulsified in the same aqueous medium to provide the latex. Generally the chain-extension reaction is substantially completed in less than an hour, though some chain extension can continue for as long as 36 hours, and the emulsification of the resulting latex solids is substantially complete or well underway before (sometimes well before) the chain extension reaction is completed. An alternative method is to prepare a prepolymer with no self-emulsifying sites. The aqueous medium is, in this method, a solution of a chain-extender containing a salt or salt-forming group. An example of such a chain-extender would be 1-[bis(aminoethyl)amino] propane-3-sulfonic acid and the salts thereof. See U.S. patent application Ser. No. 869,337 of Robert C. Carlson, filed Oct. 24, 1969, for further examples of such chain extenders.

A less preferred emulsification method is described in U.S. Pat. No. 2,968,575 (Mallonee), issued Jan. 17, 1961; in this method a separate emulsifying agent is used or formed during the emulsifying step to provide the oil-in-water emulsion of the cured (chain-extended) polyurethane-type prepolymer. This method is less suitable for use in this invention, because a separate or external emulsifying agent will be a separate component of the dried latex solids (i.e. not a substituent or component of the chain-extended prepolymer) and can interfere with or reduce tack. Careful selection of the emulsifying agent will mitigate this loss of tack, however.

Organic solvents can be used, if necessary, to reduce prepolymer viscosity, in any of the prefered methods, provided that the chain extension step is carried out in a substantially aqueous medium.

Another less preferred method is to prepare the polyurethane-type prepolymer and chain extend it in primarily organic solvent medium prior to emulsification. A stable latex with good pressure-sensitive adhesive capabilities is difficult to achieve by this method. A feature of this less preferred method is that the chain extender could be a diol. In the preferred methods of this invention, the chain extender is either a diamine or, preferably, water. Thus, the "polyurethane-type" latex solids of this invention are preferably polyurethane-polyureas or polyureas rather than pure "polyurethanes" in the strict sense of the term.

The above-described prepolymer can be prepared from commonly used starting materials such as poly(oxyalkylene) polyols and diisocyanates, but it is essential that at least one branch of the prepolymer be a pendant chain which is not normally chain-extendable. For example, a mol of poly(oxyalkylene)polyol could be reacted with an amount of diisocyanate insufficient to react with all the hydroxyls, leaving at least one hydroxy-terminated chain which would not react with water or diamines. This method of providing pendant chains, is, however, rather difficult to control, except in solvent media.

The preferred method involves the use of end capping with a monofunctional material. One scheme for such end capping involves a reaction represented by the following simplified equation:

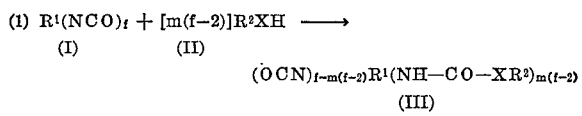

In Equation 1, Formula I represents a prepolymer starting material with an —NCO functionality of $f$; if this starting material is a mixture of compounds of different functionality, $f$ is the average functionality. If the Formula I prepolymer is a compound or compounds having all the same functionality, $f$ is an integer greater than 2 (e.g., 3–8 or preferably 3–6); if different functionalities are mixed, $f$ is at least 2.5. The symbol $m$ represents a number ranging from about 0.5 to about 1.35.

$R^1$ is a complex radical containing repeating oxyalkylene or ester units, oxyalkylene-thioester units, or the like. $R^1$ is selected such that the equivalent weight of Compound I, i.e. molecular weight divided by $f$, is at least about 500, but less than about 4000.

$R^2$ is an aprotic, polar or non-polar organic group.

Ordinarily, $R^1$ is provided from a poly(oxyalkylene) polyol or polyester polyol which is interacted with just enough organic diisocyanate to provide a compound of Formula I, i.e. an isocyanate terminated prepolymer with a molecular weight of, preferably less than 10,000. Compounds of the general type shown as Formula I are well known and can be made from polyester or poly(oxyalkylene) polyols or the like according to the teachings of U.S. Pat. 3,178,310 (Berger et al.), issued Apr. 13, 1965, col. 3–col. 6. $R^2$ is free of active hydrogens, —NCO groups, and groups reactive with either —NCO or active hydrogen, and can contain hydrophilic groups. Preferably $R^2$ is the residue of a mono-ol such as a lower alkanol, a dialkylalkanolamine, or a poly(oxyethylene) mono-ol. The latter type of mono-ols are available as poly(oxyethylene) mono-ol, monoesters or -monoethers. Although $R^1$ is preferably derived from a polyol, polymercaptan and polyamine materials can also be used; reference is made to the general type of materials disclosed in Table III of U.S. Pat. 3,440,273 (Bertozzi), issued Apr. 22, 1969, and in U.S. Pat. 3,179,606 (Prescott et al.), issued Apr. 20, 1965.

XH is an active hydrogen-bearing substituent; thus X is O, NH, N-alkyl, S, and the like.

Formula III represents a prepolymer starting material suitable for use in making latices of this invention (which can be a mixture of compounds with different $f$ values). A principal component of the starting material is a compound wherein $f$ is an integer of at least 3 and $m=1$, i.e. a prepolymer having two free —NCO groups and $f-2$ pendant chains. The pendant chains (1) amount to at least about 20 wt. percent of the prepolymer, and (2) are made up of atoms totaling about 600 to about 4,000 atom mass units (A.M.U.). This prepolymer material can be chain extended in aqueous or organic media, preferably in an aqueous medium; the two free NCO groups will react with water or a suitable diamine to provide a polymer containing repeating units of the formula:

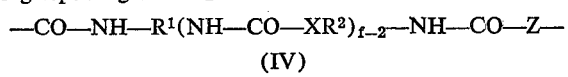

wherein Z is NH or a di-(primary or secondary) amine with a hydrogen removed from each amino group; in the latter case Z can contain hydrophilic groups such as protonated tertiary nitrogens or other salt or salt-forming groups such as a sulfonic acid group or salts thereof; and wherein $R^1$, $R^2$, $f$, and X are as defined previously. Most significantly, the $R^1$ of this repeating unit has now been provided with $f-2$ pendant chains of about 600–4000 A.M.U., each capped with —NH—CO—$XR^2$. At least about 20 wt. percent of the polymer containing units of Formula IV comprises such pendant chains.

Another scheme for end capping makes use of a reaction represented as follows:

(2)

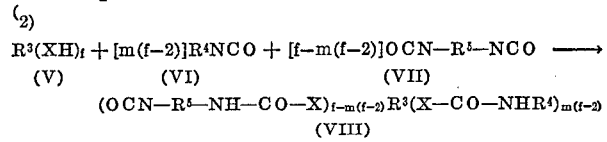

In Equation 2, Compound V is a poly(oxyalkylene) or 500 to about 4000) or a mixture of such compounds polyester compound of low equivalent weight (e.g. about having $f$ or an average of $f$ active-hydrogen-bearing (XH) groups; thus, $R^3$ is a complex radical somewhat similar to $R^1$, described previously.

X, $f$, and $m$ are as defined previously.

$R^4$ is an organic radical free of active hydrogens, and is preferably an aromatic nucleus, e.g. phenyl. A self-emulsifying group can be included within $R^4$, e.g.

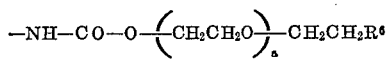

wherein $a$ is 5–20 and $R^6$ is an ester group.

$R^5$ is also preferably aromatic and is also free of active hydrogens. Thus Compound VII can be any of the commonly used diisocyanates such as toluene diisocyanate (TDI), 4,4'-diphenylmethane diisocyanate (MDI), xylyl diisocyanate (XDI), naphthalene diisocyanate, and the like. Alkylene diisocyanates are not readily water cured, but can be used if the resulting prepolymer Compound VIII is chain extended in an organic liquid medium rather than in water.

Formula VIII represents a prepolymer or mixture suitable for use in making latices of this invention; by analogy to Formula III, a principal component of this prepolymer mixture is the compound wherein $m=1$ and $f$ is an integer equal to at least 3. The Formula VIII prepolymers react with water and/or diamines in a manner analogous to the chain extension of Compound III to yield a polymer containing repeating units of the formula:

—CO—NH—R⁵—NH—CO—
    X—R³(XCONHR⁴)$_{f-2}$—X—
                        CO—NH—R⁵—NH—CO—X—

(IX)

wherein X, $f$, $R_3$, $R_4$, and $R^5$ are as defined in Equation 2 and Z is as defined for Compound IV. It should be noted that, by analogy to Compound IV, this repeating unit of Compound IX has been provided with $f-2$ pendant chains of about 600–4000 A.M.U., each capped with —X—CO—NH—R⁴. At least about 20 wt. percent of the polymer containing units of Formula IX comprises such pendant chains.

When the XH radical of Compound V is hydroxyl, an esterification reaction can be used to provide end-capping, as follows:

(3)

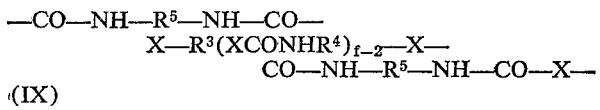

In Equation 3, R³, $m$, $f$, and R⁵ are as defined in Equation 2, and E is the residue of the esterifying agent. For example, E can be a monovalent aliphatic or aromatic radical derived from a carboxylic acid or carboxylic acid anhydride or halide. For simplicity and economy, the esterifying agent can be acetic anhydride, in which case E is methyl. Prepolymer VIII-A can be chain extended in the same manner as prepolymer VIII to provide a polymer with repeating units of the formula:

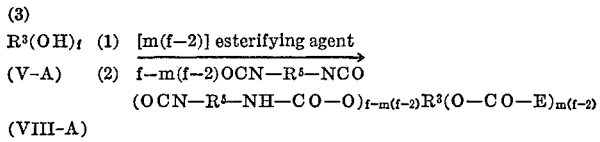

(IX-A)

wherein $f$, R³, E, R⁵, and Z are as in Formula IX.

The aforementioned end capping schemes can be combined with known methods for introducing hydrophilic groups into the polymer backbone, e.g. chain extension with an alkyldiethanolamine, which introduces protonatable tertiary nitrogens into the polymer backbone; alkoxy capping of pendant OH is also useful.

The prepolymers of Formula III can provide extremely stable latices when chain extended in water or an aqueous solution containing a diamine chain extender. Among the Formula III prepolymers are those prepared from diisocyanate-capped poly(oxyalkylene) glycols and the following monofunctional end-capping compound:

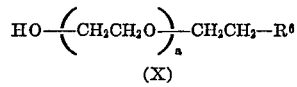

wherein $a$ is an integer selected such that the pendant chain will be hydrophilic and yet not unduly interfere with the tackiness of the chain-extended prepolymer, e.g. 5–20;

$R^6$ is an organic radical free of active-hydrogens or other atoms or radicals reactive with either active-hydrogen or NCO; e.g. an ether or ester group such as the ester groups derivable from the terminal —CH₂CH₂OH unit of a poly(oxyethylene) glycol and saturated or unsaturated aliphatic carboxylic acids. When the Formula III prepolymer is end-capped with a Formula X compound, it is preferred that salt forming groups also be included in the prepolymer, e.g. by sulfonation of aromatic rings in the prepolymer according to the teachings of Carlson, U.S. patent application Ser. No. 841,570, filed July 14, 1969.

Another particularly suitable monofunctional end-capping compound is:

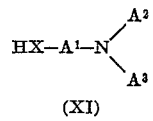

(XI)

wherein X is as defined in Formula II and A¹, A², and A³ are aliphatic groups free of active H or NCO or groups reactive therewith.

For particularly stable latices, Compound XI is

HO-(lower alkylene)-N(lower alkyl)₂

When a prepolymer having pendant chains and capped with Compound X is chain extended in water or an aqueous diamine solution, the oxyethylene units of Formula X serve as the hydrophilic group which facilitates or permits self-emulsification of the chain-extended prepolymer, and —SO₃H groups, if present, can be neutralized to provide further self-emulsification. Likewise, protonatable tertiary nitrogens, if present, can be protonated, for this purpose.

When a prepolymer end capped with Compound XI is chain extended in a similar fashion, a source of protons is added to the aqueous chain extending/emulsifying medium before or during emulsification in order to protonate the tertiary nitrogen, thus providing a tertiary ammonium cation at the ends of the pendant chains. This location of the cationic group provides good self-emulsification and, for reasons which are not entirely clear, an unusually stable, small particle latex (e.g. particle sizes below 1 micron). Such latices have apparently unlimited shelf life at ambient temperatures varying from −55 to 100° C. When dried to a film, these small latex particles provide optimum pressure-sensitive adhesive properties, including tackiness and peel strength. The source of protons can be an organic or inorganic, water-soluble Bronsted acid with a $pK_a$ of less than about 5 provided the acid is free of groups (other than the acid hydrogen or hydrogens) reactive with NCO and does not interfere with the emulsification; it is preferred to use HCl or acids such as the water soluble aliphatic carboxylic acids, e.g. alkanoic acids, e.g. alkanoic acids of 1–4 carbon atoms. In any event, side reactions between NCO groups and the acid should always be minimized.

The most preferred starting materials for making prepolymers for use in this invention comprise:

(1) a poly(oxyalkylene) triol having an equivalent weight of about 700–1000 (a molecular weight of about 2100–3000) and/or poly(oxyalkylene) tetrol having a similar equivalent weight (a molecular weight of about 2800–4000), preferably a mixture of the triol and tetrol. Higher polyols based on mannitol, sorbitol, carbohydrates, castor oil, polyvinyl alcohol, or the like are useful but less available.

(2) a diisocyanate such as TDI, MDI, XDI, or 1,5-naphthalene diisocyanate, or mixtures thereof, or, less preferably, phenylene diisocyanate; the amount of diisocyanate should be selected such that the NCO/OH ratio prior to end-capping is about 1.5:1 to about 2.5:1, preferably about 1.8:1 to about 2.05:1 when TDI is used as the diisocyanate. The use of 2,4- and/or 2,6- TDI is convenient because of the ready availability of these isomers, but it is permissible to use other isomers.

(3) a monohydroxy capping agent, e.g. a lower alkanol such as n-butanol or, preferably, a compound of the formula (lower alkyl)$_2$N-(lower alkylene)-OH such as diethylethanolamine, diisopropylethanolamine or the like.

The aforesaid poly(oxyalkylene) triol can be derived from a monomeric triol such as glycerin or trimethylol propane and an O-heterocycle such as 1,2-propylene oxide, ethylene oxide, 1,2-butylene oxide, tetrahydrofuran, etc. It is preferred that, if ethylene oxide is used (providing oxyethylene units) that at least some oxypropylene or oxybutylene units be present to reduce the hydrophilicity of the prepolymer. The tetrol can be similarly derived from pentaerithritol or the like, but is preferably derived from an alkylene diamine, thus providing a polyol with two sterically hindered tertiary nitrogens, as follows:

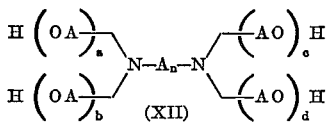

wherein $n$ is a small integer such as 1, A is alkylene of, for example, 2–4 carbon atoms, and $a$, $b$, $c$, and $d$ are selected such that the equivalent weight of the tetrol is in the preferred range. The oxyalkylene units (OA) need not all be the same. As in the case of the triol, it is much preferred that at least some oxypropylene or oxybutylene units be included in the chains to reduce the hydrophilicity of oxyethylene units are present. The oxyethylene units are most useful at the ends of the poly(oxyalkylene) chains. If the tetrol pendant chains are capped with a polar capping agent such as an acid anhydride prior to treatment with a diisocyanate, the oxyethylene units at and near the end of the resulting pendant chain can facilitate emulsification.

A prepolymer can be formed in a homogenous liquid reaction medium of triol/tetrol and diisocyanate by mixing these materials and applying mild heat, e.g. 80–90° C. If desired, an organic solvent can be added to the reaction medium to reduce viscosity. This solvent should be distilled from aqueous latices made from the organic prepolymer phase.

Less heat (e.g. 50–70° C.) should be used during the capping step if a dialkylalkanolamine is the capping agent; the tertiary nitrogen can have a catalytic effect upon the NCO/OH reaction.

The 100% modulus of adhesive films produced according to this invention is affected by the choice of starting materials and by the method of chain extension. The following factors can be controlled to produce polymeric solids which provide films with the desired 100% modulus:

| High modulus | Low modulus |
| --- | --- |
| Low functionality prepolymers (e.g. 2.5–3 equiv. of OH) capped with relatively low amount of monofunctional capping agent. | High functionality prepolymers (at least some tetrol or higher) capped with relatively high amount of monofunctional capping agent. |
| Polyester units or low wt. percent oxyalkylene units (e.g. from 500 equiv. wt. polyol). | High wt. percent oxyalkylene units. |
| High wt. percent aromatic nuclei, preferably polycyclic (e.g. MDI). | Low wt. percent aromatic nuclei, preferably monocyclic (e.g. TDI) or aliphatic groups in place of such nuclei, if possible. |
| Cross-linking—up to one crosslink per 4000 A.M.U. | Little or no cross-linking—less than one per 8000 A.M.U. |
| Amine cures (e.g. chain extension with piperazine). | Water cures. |

For example, for a prepolymer derived from TDI, XDI, and/or MDI and poly(oxypropylene) triol/tetrol and capped with an appropriate capping agent, the amount of aromatic nuclei in the polymer backbone can be as low as 5 wt. percent or as high as 15 wt. percent (but preferably not over 12 wt. percent), the basis for the percentage being the total polymer weight (backbone+pendant chains). If a substantial portion of the remainder of the polymer is oxyalkylene units, the wt. percent backbone aromatic nuclei is one of the most important factors affecting 100% modulus.

The "100% modulus" referred to herein is most conveniently determined using a constant rate of extension tensile tester at 25° C. and an extension rate of 50.8 cm./min. (20 in./min.). Constant rate tensile testers are described in The Science and Technology of Polymer Films, vol. I, O. J. Sweeting, ed., Interscience, Pub., New York, 1968, pp. 553–554, and a particularly suitable type is known by the trade designation "Instron."

The preferred polymers for latex systems, as pointed out earlier, contain hydrophilic groups to aid emulsification and latex formation. A surprising feature of this invention is that hindered tertiary amine-containing prepolymers (see Formula XII, supra; analogous triols are derived from ammonia) which contain cation-forming groups such as tertiary amines, and/or oxyethylene units at the ends of pendant chains (or similar high concentrations of hydrophilic groups near the ends of pendant chains) provide, upon chain extension in water, latices which are self-thickening and do not require the use of any additional thickening agents. However, any of the conventional thickening agents can, if desired, be added to the adhesive systems of this invention.

Furthermore, conventional pigments, fillers, protective colloids, and similar additives can be included in these adhesive systems, or various adhesive systems of this invention can be mixed together or with other conventional adhesives. Modifiers can also be added to be finished adhesive systems, e.g. active —H containing materials or the like. Another useful feature of this invention is that adhesive systems comprising polymers with little or no crosslinking can be provided with an after-treatment crosslinking capability, e.g. by including latent polymerizable groups (including acrylates and the like) in the end-capping agents. Such latent polymerizable groups can be activated with heat, electromagnetic energy, or chemical agents such as peroxides, formaldehyde, sulfur sol, or the like.

A particularly suitable latent polymerizable group is epsilon-caprolactam. Heat de-latentizes the epsilon-capralactam capping group by liberating free —NCO. Hydroxy-ethylacrylate can be used as the monofunctional capping agent to provide reactive unsaturated sites. Advantages of this after-crosslinking are that the modulus can be raised (and tackiness can be reduced, if desired) after film formation, or crosslinks can form with a reactive substrate, thus increasing adhesion between the film and such substrates. It is even possible to render the film substantially non-tacky on an exposed surface yet chemically bonded to a reactive substrate.

Although the preferred aqueous latices are self-emulsified, external emulsifiers can be added to latices of this invention (particularly those containing no self-emulsifying groups) provided tack or stability are not adversely affected. The preferred emulsifiers are anionic, e.g. the dodecylbenzene sulfonate type. Useful anionic emulsifiers include "Ninate 411" (trademark of Alcolac Chemical Corp.), "Pilot NEL–60" (trade designation) which contains nonyl phenyl polyethoxysulfate, and "Sulfonate AA10" (Tennessee Corp. designation for dodecylbenzene sulfonate, sodium salt). Most nonionic external emulsifiers partially or completely mask tack, and are not preferred for use in this invention. Cationic external emulsifiers do not necessarily mask tack, but rarely provide good latex stability.

Regardless of the method of emulsification in water or solution or suspension in organic media, the preferred, inherently tacky polymeric solids of this invention can provide films with a distinctly perceptible tacky feel without the use of external tackifiers. By "distinctly perceptible" is meant a probe tack value of at least 20 grams, preferably at least 40 grams, determined with a $\frac{1}{16}$ in. (0.159 cm.) diameter stainless steel probe (ASTM 221(64)1957) used in a "polyken" probe tack tester, the probe being adhered to the adhesive film for 1 second and removed at a rate of 0.5 cm./sec.; the film tested is ordinarily at least 0.125 mm. thick and is ordinarily coated on a glass substrate. Probe tack values of 5–20 grams (observed with the less tacky embodiments of this invention) are not preferred, but are still useful when a strong adhesive bond is unnecessary or undesirable or when bonding to wood or skin.

The latex adhesive systems of this invention exhibit surprisingly good adhesion to wood and human skin. These latex systems are particularly useful as "contact" adhesives, wherein a coating of latex on two substrates is permitted to dry, and the two substrates are pressed together. "Contact" adhesives are commonly used in the furniture industry to attach phenol- or urea-formaldehyde veneers to wooden table or desk counter tops. Decorative tiles can also be glued to a wooden or plasterboard base in this manner.

These latex systems are also useful as primers and have good mechanical stability, which permits relative movement of bonded substrates with no loss of adhesive power if the adhesive interlayer is still wet.

The method of calculating the weight percent of pendant chains will now be described by referring to Formulas IV, IX, and IX–A, given previously. In all of these formulas for repeating polymer units, a complex radical ($R^1$ or $R^3$) contains $f-2$ pendant chains capped with —NH—CO—$XR^2$, —O—alkyl, —XCONHR$^4$, —O—CO—E, or the like. The pendant chains begin at a branching site in $R^1$ or $R^3$ (e.g. an etherified or esterified functional group of a monomeric polyol residue such as trimethylolpropane, glycerin, mannitol, etc. or a carbon-to-nitrogen link to an amino residue of a compound such as ammonia, ethylene diamine, etc.), and terminates with the capping group. The weight percent pendant chains is therefore:

$$100 \times \frac{(f-2)(C+B)}{U}$$

wherein

C is the weight of a capping group (—NHCOXR$^2$ or the like),

B is the weight of the portion $R^1$ or $R^3$, beginning at a branching site, to which a capping group is attached, U is the weight of a repeating unit of the chain-extended polymer (e.g. the unit of Formulas IV, IX, or IX–A), and $f$ is as defined previously for Formulas IV, IX, and IX–A.

The expression for the wt. percent pendant chains of a prepolymer would be similar to expression (4), except that U would be the weight of a single prepolymer unit. (Isocyanate-terminated prepolymers can dimerize, trimerize, etc., but this does not affect the principles of this invention and a single prepolymer unit can be assumed.) For a typical prepolymer derived from a polyol equivalent weight P with an average functionality of $f$, a diisocyanate of equivalent weight D, and $m(f-2)$ moles of monofunctional, active hydrogen-containing capping agent with an equivalent weight of E, where $m$ and $f$ are as defined for Equations 1–3, supra, and NCO/OH is the poly-NCO to polyol equivalent ratio, the numerator of expression (4) would be:

(5) $\quad (f-2)m[P+D(NCO/OH)+E]$ and the denominator (U) would be:

(6) $\quad fP+fD(NCO/OH)+m(f-2)E$

Expressions (5) and (6) need not be significantly altered to calculate the percent pendant chains of a water-cured polymer derived from this typical prepolymer, but, for other cures, the weight of the chain extender would add to expression (6).

It should be noted that the factors of expressions (5) and (6) and the conditions, reactants, and mechanisms of chain extension act as parameters determining the molecular weight of the resulting solid, chain-extended polymer. For example, if P were 500, $m$ were 0.5, and $f$ averaged out to 2.5, a solid polymer would result even if its molecular weight were not significantly greater than 10,000. However, if P were 4000, $m$ were 1.35, and $f$ averaged out to about 6 or 8, a solid prepolymer could ordinarily not be obtained unless the molecular weight were permitted to exceed at least about 50,000.

In the following non-limiting examples, all parts are by weight unless otherwise indicated.

EXAMPLES 1–11

(I) Procedure

Step A.—The poly(oxyalkylene) polyol starting material was dehydrated in vacuo at 100–110° C. for 30 minutes and cooled to room temperature before being reacted with the mono- or polycyclic-arylene or aralkylene diisocyanate. In Example 8, phenyl isocyanate was mixed with the diisocyanate to provide partial end capping. The arylene diisocyanates used were 80/20 (wt.) 2,4/2,6-tolylene diisocyanate (also called toluene diisocyanate or TDI), 4,4' - diphenylmethane diisocyanate (hereinafter called MDI), and 1,5-naphthalene diisocyanate (hereinafter called NDI). Xylylene diisocyanate (hereinafter called XDI) was used as the aralkylene diisocyanate. The poly(oxyalkylene) polyol component was reacted with the diisocyanate component at 85–88° C. for 4–5 hours, depending on the speed of the NCO/polyol reaction. Less time was needed in Example 6 (3 hours) and more time in Example 11 (8.5 hours). After this NCO/polyol reaction, an NCO-terminated prepolymer was obtained.

Step (B).—The product of Step (A), if then reacted with 1-butanol or polyoxyethylene glycol mono-oleate, was kept at 85–88° C. for one more hour to complete the NCO/mono-ol reaction (Examples 5 and 6, respectively). Before reacting any prepolymer with a tertiary amine component (diethylethanolamine or mixtures thereof with methyl diethanolamine or 1-butanol), whether or not the prepolymer was already partially end-capped with mono-ol or phenyl isocyanate, the prepolymer was cooled to 60° C. and permitted to exotherm about 5° C. In Example 2 the product of Step (A) was cooled and reacted directly with a diethylethanolamine/butanol mixture. The tertiary amines and/or the 1-butanol were diluted with dry toluene prior to addition; other than this toluene, no organic solvents were necessary in any step of the processes of Examples 1–11. The tertiary amine/prepolymer reactions were carried out at 60–65° C. for one hour, except in Examples 1 (45 min.) and 6 (30 min.).

Step C.—Stable cationic latices were formed by adding the product of Step (B) to an aqueous acetic acid solution in a separate container equipped with a high speed, high shear mixer (an Eppenbach Homomixer). Or, glacial acetic acid was added directly to the product of Step (B), stirred for 5 minutes, and then added to a container of deionized water equipped with the mixer (Ex. 5). In any event, the resulting emulsion is stirred to remove entrapped carbon dioxide, if any, and left to stand for at least 24 hours to completely cure.

(II) Formulations

In the following tabulation of the formulations for Step (A) of Section I, supra, the following abbreviations are used:

EW for equivalent weight,
P2 for poly(oxypropylene) glycol,
P3 for poly(oxypropylene) triol,
P4 for poly(oxypropylene/oxyethylene) tetrol from 90/10 propylene oxide/ethylene oxide extension of ethylene diamine, and
P6 for poly(oxypropylene) hexol made by the propylene oxide extension of sorbitol.

STEP (A): NCO/POLYOL FORMULATIONS

| Ex. | Polyol | Di-NCO | NCO/OH |
|---|---|---|---|
| 1 | | | |
| 2 | 404 g. P3, EW 897; 272 g. P4, EW 902 | 134 g. TDI | 2.05:1 |
| 3 | 248 g. P6, EW 400; 545 g. P4, EW 875 | 222 g. TDI | 2.05:1 |
|  | 803 g. P3, EW 982; 131 g. P2, EW 995 306 g. P3, EW 1,700. | 174 g. TDI | 1.76:1 |
| 4 | 1,315 g. P4, EW 1315 | 174 g. TDI | 2.0:1 |
| 5 | 717 g. P3, EW 897; 481 g. P4, EW 902 | 203 g. TDI | 1.75:1 |
| 6 | 454 g. P3, EW 505; [Reaction time: 3 hr.] | 137 g. TDI | 1.75:1 |
| 7 | 850 g. P3, EW 1,700 | 87 g. TDI | 2.0:1 |
| 8 | 538 g. P3, EW 897; 361 g. P4, EW 902 | 104.4 g. TDI | (¹) |
| 9 | 2,150 g. P3, EW 897; 1,443 g. P4, EW 902 | {441 g. TDI, 1238 g. XDI} | 1.90:1 |
| 10 | 850 g. P3, EW 1,700; 491 g. P4, EW 981 | 209 g. MDI | 1.70:1 |
| 11 | 850 g. P3, EW 1,700; 491 g. P4, EW 981 | 713 g. NDI | 1.80:1 |
|  | [reaction time: 8.5 hours]. | | |

¹ Polyol simultaneously reacted with 104.4 g. TDI and 47.6 g. phenyl isocyanate, resulting in a 2:1 NCO/OH ratio, based on both mono- and di-functional isocyanate.

In the following tabulation of the formulations for Step (B) of Section I, supra, the following abbreviations are used:

DEEOA for diethylethanolamine,
MDEOA for methyl diethanolamine,
BuOH for 1-butanol, and
PGM, for poly(oxyethylene) glycol mono-oleate, molecular wt. of glycol portion=about 600,
$m$ is as defined previously in expressions (5) and (6).

STEP (B): END CAPPING FORMULATIONS

| Ex.¹ | DEEOA | MDEOA | BuOH | PGM | Diluent toluene | $m$ |
|---|---|---|---|---|---|---|
| 1 | 35.1 | | | | 35.1 | 1.00 |
| 2 | ·20.30 | | 44.15 | | 100 | 1.05 |
| 3 | 39.0 | | | | 100 | 1.00 |
| 4 | 58.5 | | | | 58.5 | 1.00 |
| 5 | 31.25 | | 20.05 | | {20.05/BuOH, 31.25/DEEOA} | 1.00 |
| 6 | 7.03 | 10.05 | | 236 | 100 | 1.10 |
| 7 | 19.6 | | | | 40 | 1.00 |
| 8 | 4.69 | 15.05 | | | 40 | 1.10 |
| 9 | 206.5 | | | | 206.5 | 1.10 |
| 10 | 43.7 | | | | 43.7 | 1.10 |
| 11 | 43.0 | | | | 43.0 | 1.10 |

¹ NOTES.—
Ex. 2: DEEOA mixed with BuOH and toluene.
Ex. 5: BuOH, 1:1 in toluene, reacted first, then 1:1 DEEOA:toluene.
Ex. 6: PGM (glycol portion mol. wt. about 600) reacted first; then DEEOA+BuOH+toluene mixture.
Ex. 8: Already partially end-capped with phenyl-NCO.

In the following tabulation of the formulations for Step (C) of Section I, supra, HOAc represents glacial acetic acid and H₂O represents deionized water. In all of Examples 1–11 the product of Step (B) was added to the aqueous HOAc (or neutral water in the case of Example 5) while still hot. The term "self-thickening" used herein means thickened with a chemical (e.g. acetic acid) which is not normally characterized as a thickening agent.

STEP (C): EMULSIFICATION

| | GRAMS | |
|---|---|---|
| Example¹ | HOAc | H₂O |
| 1 | 27 | 1,800 |
| 2 | 27 | 1,080 |
| 4 | 40 | 3,000 |
| 4 | 30 | 3,100 |
| 5 | 8 | 1,300 |
| 6 | 17 | 2,800 |
| 7 | 10 | 1,500 |
| 8 | 20 | 2,300 |
| 9 | 10.5 | 7,700 |
| 10 | 22.0 | 2,380 |
| 11 | 22.0 | 2,400 |

¹ Comments re latices.—
Ex. 1: Extremely stable latex with bluish cast, viscosity (6 r.p.m.) 19,000 cps. at 26° C., 30.5 wt. per cent solids (Brookfield LVF Viscometer, Spindle 4); self-thickening upon addition of more HOAc. Thixotropic: 13,000 cps. at 12 r.p.m.; 7,600 cps. at 30 r.p.m.
Ex. 4: Small particle latex, amber colored, Brookfield viscosity 13,000 cps. at 24° C., 31.9 wt. percent solids, self-thickening upon addition of 2 parts HOAc to 100 parts emulsion.
Ex. 5: HOAc added directly to 750 g. of product of Step (B), then acidified product added to 1,300 g. neutral H₂O.
Ex. 6: Extremely stable, small particle, thixotropic, viscous, self-thickening latex:
Viscosity at 33.3° C.: 6 r.p.m.=12,000 cps.; 12 r.p.m.=7,500 cps.; 30 r.p.m.=4,200 cps.; 60 r.p.m.=3,000 cps.
Viscosity at 26.4° C.: 6 r.p.m.=63,000 cps.; 12 r.p.m.=37,000 cps.; 30 r.p.m.=19,000 cps.; 60 r.p.m.=10,000 cps.

(III) Properties of cast films

Tack was tested at room temperature and 50% relative humidity (R.H.) according to the "Polyken" probe tack test described previously. Films cast and dried at room temperature were heated briefly at 65° C.–105° C. and then conditioned for 24 hours at 22° C., 50% R.H. prior to testing. Films made from the latices of all of Examples 1–11 were tacky to the touch, but room temperature stainless steel probe tack values were not always obtainable, particularly with the higher modulus films.

Films for the 100% modulus test were cast on glass dishes at room temperature to a dry thickness of 15–25 mils (.38–64 mm.), conditioned at 25° C., 50% R.H. for 24 hours, further conditioned at 65° C. for 12 hours, and dusted with clay prior to insertion in the "Instron." All 100% modulus measurements were made at 25° C., 50% R.H.

| Example | 100% modulus (p.s.i.) | Probe Area of tack drawing, (g.) A–E |
|---|---|---|
| 1 | 63 | 10 E |
| 3 | 33 | 50 D |
| 4 | 6 | 25 B |
| 5 | 8 | 40 B |
| 6 | 13 | 65 B |
| 7 | 70 | 10 E |
| 8 | 2 | 75 B |

¹ Tacky to skin, high internal strength.

EXAMPLES 12–18

(I) Procedure

Step (A).—The polyol component was dehydrated as in Examples 1–11 and reacted with 80/20 2,4/2,6-TDI at 88° C. as in Examples 1–11. The TDI/polyol mixture was held at 88° C. for 3 hours (Examples 12 and 14) or 4 hours for the slightly slower reactions (Examples 13 and 15–18).

Step (B); Examples 12–17.—MDEOA diluted with dry acetone or toluene was then added to the reaction mixture, which was further reacted for one hour (in Example 13 the MDEOA was added at 75° C., otherwise the reaction with MDEOA was held at 88° C.). The TDI/polyol/MDEOA product was then reacted with the capping agent for 2 additional hours at 75° C. in Example 12, for one additional hour at 75° C. in Example 13, and for one additional hour at 88° C. in Examples 14–17. The capping agent was 1-butanol in Examples 12–15 and 17 and epsilon-caprolactam in Example 16.

Step (B); Example 18.—No MDEOA was used. The capping agent (1-butanol) was added directly to the product of Step (A) and the reactants were held at 88° C. for one hour.

Step (C).—In Examples 12–17 the preparation of an aqueous phase and the emulsification therein was substantially as in Examples 1–14 and 6–11, the product of Step (B) being added while still hot, and the water cure to a stable cationic latex lasting at least 24 hours. In Example 18 no sites were available for self-emulsification; hence, the aqueous phase contained 1.5 wt. percent of an external emulsifier, sodium dodecylbenzene sulfonate ("Sulfonate AA 10," trade designation of Tennessee Corp.). Otherwise the emulsification procedure was the same.

(II) Formulations

The abbreviations and symbols used in Examples 1–11 are used herein.

STEP (A): NCO/POLYOL FORMULATIONS
[Including backbone tertiary nitrogen component]

| Ex. | Polyol | TDI (g.) | NCO/OH | MDEOA/diluent (T = toluene) |
|---|---|---|---|---|
| 12 | 496 g. P6, EW 550 | 189 | 2.4:1 | 8.56 g./45 g. T.[1] |
| 13 | 2,000 g. P3, EW 1,655; 675 g. P3, EW 865; 675 g. P4, EW 900. | 452 | 1.9:1 | 76.0 g./200 g. acetone. |
| 14 | 2,070 g. P3, EW 862; 1,467 g. P4, EW 917. | 713 | 2.05:1 | 84.66 g./400 g. T. |
| 15 | 331 g. P3, EW 862; 235 g. P4, EW 918. | 114 | 2.05:1 | 13.56 g./14 g. T. |
| 16 | 331 g. P3, EW 862; 235 g. P4, EW 918. | 114 | 2.05:1 | 13.56 g./14 g. T. |
| 17 | 363 g. P3, EW 897; 261 g. P4, EW 918. | 126 | 2.11:1 | 15.0 g./g. T. |
| 18 | 898 g. P3, EW 897 | 174 | 2.0:1 | |

[1] 45 g. acetone added after addition of MDEOA/toluene to further reduce viscosity.

STEP (B): END CAPPING FORMULATIONS

| Ex. | Epsilon-caprolactam | BuOH | Diluent (toluene) | m |
|---|---|---|---|---|
| 12 | | 49.6 | | 1.05 |
| 13 | | 94.0 | | 1.23 |
| 14 | | 142 | | 1.20 |
| 15 | | 18.78 | 19 | 0.99 |
| 16 | 31.7 | | 31.7 | 1.10 |
| 17 | | 16.65 | 16.65 | 0.81 |
| 18 | | 27.1 | 27.1 | 1.05 |

STEP (C): EMULSIFICATION

| Example | 12 | 13 | 14 | 15 | 16 | 17 | 18 |
|---|---|---|---|---|---|---|---|
| HOAc | 28.5 g | 98 g | 170 g | 10.5 g | 10.5 g | 10.25 g | |
| H₂O | 2,300 g | 6,500 g | 9,500 g | 1,250 g | 1,250 g | 880 g | 2,200 g |
| Sulfonate emulsifier ("AA10") | | | | | | | 33 g. |
| Comments | Stable | Stable, 31.9% solids, 100 cps., self-thickened.[1] | Stable, 30.7% solids, 1,075 cps. | Stable, 34.1% solids | Stable, self-thickened with HOAc. | Stable | Stable. |

[1] Ex. 13: Thickened with 2 wt. percent additional HOAc to 15,000 cps. to 33,000 cps. with 5 wt. percent additional HOAc.

(III) Properties of cast films

Tack and 100% modulus were tested as in Examples 1–11. Representative results:

| Example | 100% modulus (p.s.i.) | Probe tack (g.) | Area of drawing (A–E) |
|---|---|---|---|
| 13 | 8 | 50 | B |
| 16 | 15 | 35 | B |
| 17 | 6 | 20 | B |
| 18 | 42 | 10 | D |

[1] Tacky to skin.

The film of Example 16 can be rendered non-tacky by heating, e.g. to 190° C. for 90 seconds. An untreated tacky film of Example 16 is peelable from glossy cardboard, but two minutes heat treatment at 190° C. can cause it to chemically bond to the cardboard, whereby it is no longer peelable. By contrast, a film of the Example 15 polymer neither loses its tack nor chemically bonds to glossy cardboard after similar heat treatments.

Three films of the polymer latex of Example 16 were cast in glass dishes treated with a mold release, and allowed to air dry at 28° C., 50% relative humidity for 24 hours, then heated at 65° C. for 24 hours.

One film was returned immediately to the 28° C., 50% relative humidity atmosphere for reconditioning. The second was first heated at 190° C. for 45 seconds then returned to the 28° C. room. The third film was heated at 190° C. for 5 minutes, then returned to the 28° C. room. All three films were allowed to equilibrate at 28° C., 50% relative humidity for 24 hours and then tested on an Instron tensile tester.

| Time at 190° C.: | Force to extend 100% elongation, p.s.i. |
|---|---|
| 0 | 15 |
| 45 seconds | 52 |
| 5 minutes | 130 |

EXAMPLE 19

2298 grams of a "P3" (EW=995) was dehydrated in vacuo at 105° C. for about 30 minutes, then cooled. 402 grams of tolylene diisocyanate was added and the mixture was heated to 85° C. and held there for 3 hours with moderate stirring. Then 1080 grams of dry toluene was added to the prepolymer, and temperature was reduced to 75° C.

1932 grams of the above prepolymer was transferred to another container and mixed with 267 grams of an ethylene oxide adduct of oleic acid in which the polyoxyethylene portion is about 400 molecular weight. This monohydroxy material was reacted with the prepolymer at 75° C. for 45 minutes. 1226 grams of the prepolymer was then treated according to U.S. application Ser. No. 841,570, filed July 14, 1969, by adding 9.14 grams concentrated sulfuric acid dropwise to the prepolymer. The prepolymer was held at 75° C. for 30 minutes at which time carbon dioxide evolution had ceased. Then the temperature was reduced to 65° C. and 9.5 grams of triethylamine was added and allowed to stir for 10 minutes.

At this point 973 grams of the prepolymer was poured into a gallon container equipped with a high shear mixer (Eppenbach Homomixer) and allowed to stand and cool to 30°–35° C. 513 grams of deionized water was added to the prepolymer with full agitation. When this mixture was homogenous, a solution of 17.2 grams 2-methyl piperazine dissolved in 612 grams deionized water was added to the emulsion while continuing the high shear agitation. After about two minutes of agitation the latex was transferred to a high speed propellor-type mixer and stirred at fairly high speed for about 45 minutes. Agitation was then stopped and the latex was allowed to finish curing at room temperature. A stable anionic latex was formed. Some of the latex was dried and found to be tacky to the skin. The probe tack value was 40 g.

EXAMPLE 20

900 grams of "P4" (EW=902) were dehydrated in vacuo for 30 minutes at 100° C. and then cooled to room temperature. 56.2 grams of acetic anhydride were added along with about 1 gram concentrated sulfuric acid and the mixture was refluxed using a small amount of toluene at 135° C. for about 3 hours. Cool to room temperature, let stand overnight. The toluene was removed under reduced pressure and the temperature was gradually increased under 10 mm. pressure until no further gas evolution was noted. This modified polyol was then cooled to room temperature and 87.0 grams of tolylene diisocyanate was added. The mixture was heated to 88° C. and held for four hours, then cooled to 75° C. 17.5 grams of methyl diethanolamine were added in 60 grams toluene and allowed to react for 45 minutes at 75° C.

A solution of 17.5 grams glacial acetic acid in 1600 grams deionized water was prepared in a separate container which was equipped with a hig shear mixer (Eppenbach Homomixer). The completed prepolymer was added to the water phase with agitation, forming a stable cationic emulsion which was left to stand for several days to completely cure. The emulsion was then filtered through cheesecloth before testing.

A portion of the polymer was dried in an aluminum dish and found to be very tacky to the skin.

EXAMPLE 21

1794 grams of "P3" (EW=897), dehydrated as in Examples 1–11, and 331 grams of tolylene diisocyanate were heated at 88° C. for four hours. Then 51.85 grams of 1-butanol were added and the reaction temperature was held at 88° C. for one hour, then cooled to 55° C. 1820 grams of dry acetone were added and the temperature dropped to 38° C. At this point 9.8 grams of water were added and the batch was heated to 50° C. and held for 30 minutes, then cooled to 40° C.

2000 grams of the above solution were allowed to stand for four days at room temperature, then diluted with 100 grams of methanol and 100 grams of dimethylformamide, forming a stable solution which shows no change in viscosity after five months standings.

When some of this solution is dried, clear polymer film was deposited which was very tacky to skin.

It will be clear from the preceding examples that both nonionic and ionic sites can be present in the same polymer molecule, so long as conflicting ionic sites are not present in the same polymer system.

As the person skilled in the art will readily appreciate, the structure and cross-link density of polyurethane-type polymers and prepolymers made according to this invention are most readily understood and described by theoretical considerations derived from a knowledge of the starting materials. In actual practice, a whole spectrum of reactions and side-reactions occurs during pre-polymer formation and chain extension, but the breadth and complexity of this spectrum does not significantly affect the principles and practice of this invention.

What is claimed is:

1. A poly(oxyalkylene) or polyester prepolymer composition consisting essentially of molecules having 5–15 wt. percent aromatic nuclei in the backone and having per average molecular weight at least 20 weight percent pendant chains, each of said pendant chains having a weight of about 600 to about 4000 atomic mass units and being capped with a capping group, said capping group being derived from a compound selected from the group consisting of dialkyl alkanol amines and epsilon-caprolactam, said molecules of said prepolymer composition being terminated with per average molecular weight, about two isocyanate groups.

2. A prepolymer composition according to claim 1 wherein said molecules have, per average molecular weight, at least about 30 weight percent pendant chains.

3. A film-forming, isocyanate-free polyoxyalkylene polymer selected from the group consisting of polyurethane, polyurethane-polyurea, and polyurea polymers, said polymer having, (a) at least 20% by weight pendant chains connected to branching sites in the backbones of the polymer, said backbone containing from 5–15% by weight aromatic nuclei based on total polymer weight, (A) said chains composed of atoms totaling 600–4000 atomic mass units, (B) said chains containing dialkylamino alkyl radicals the ends of said pendant chains, (b) a cross-link density of less than 1 cross-link per 4000 polymer atomic mass units, (c) said polymer when formed into a film having, (A) a probe tack value of at least 20 grams, (B) a 100% modulus of about 1 to 50 p.s.i.

4. A polymer according to claim 3 wherein each of said pendant chains contains recurring oxyalkylene units.

5. A polymer according to claim 3 wherein said polymer is a polyurethane-polyurea.

6. A polymer according to claim 5 wherein the urea linkages of said polyurethane-polyurea are introduced in said polymer by chain extension of an isocyanate terminated prepolymer with water.

7. A polymer according to claim 5 wherein the molecular structure of said polymer contains hydrophilic groups selected from the class consisting of salt groups, salt-forming groups, and oxyethylene-containing groups.

8. A polymer according to claim 7 wherein said polymer contains protonatable tertiary nitrogen atoms in the polymer backbone.

9. A polymer according to claim 3 wherein said polymer contains at least one unit of the formula

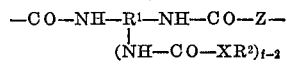

wherein
f is a number averaging at least 2.5, $R^1$ is a complex organic radical containing repeating oxyalkylene units and having f—2 pendant chains capped with

each of said pendant chains having a weight of 600–4000 atomic mass units,
$R^2$ is an aprotic organic radical,
X is the residue of an active hydrogen-bearing substituent, and
Z is NH or a di-(primary or secondary) amine with a hydrogen removed from each amino group.

10. A polymer according to claim 9 wherein $R^2$ is a lower alkyl radical.

11. A liquid composition comprising a liquid carrier and a solid polymer according to claim 3 uniformly distributed throughout said carrier.

12. A liquid composition according to claim 11 wherein said liquid carrier is water and 5–70% by weight of said system is emulsified particles of said solid polymer.

13. A liquid composition according to claim 12 wherein said particles of said solid polymer are self-emulsified by hydrophilic groups in the molecular structure of said polymer.

14. A solid film formed from evaporation of the liquid carrier of the liquid composition of claim 11, said film being tacky with respect to human skin.

15. A method of making an isocyanate-free polymer selected from the group consisting of polyurethane, polyurethane-polyurea, and polyurea polymer comprising the steps of (1) capping a prepolymer selected from the group consisting of polyurethane, polyurethane-polyurea, and polyurea prepolymer having a functionality of at least 2.5 isocyanato groups per molecule and containing from 5 to 15% by weight aromatic nuclei in the backbone with at least 0.5 equivalent of a monofunctional capping agent selected from the group consisting of epsilon caprolactam and a compound having the formula

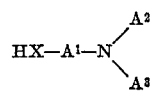

wherein X is O, NH, N—alkyl, or S, and wherein $A^1$, $A^2$, and $A^3$ are aliphatic groups free of active H or NCO or groups reactive therewith, said prepolymer being thereby provided with (a) at least 20 weight percent pendant chains, each composed of atoms totaling 600–4000 atomic mass units, and (b) $[f—m(f—2)]$ about two free —NCO groups, and (2) reacting the product of step (1) with a chain extender selected from the group consisting of water, diamine, diol, or mixtures thereof, to provide an isocyanate-free solid polymer having a cross-link density of less than 1 cross-link per 4000 polymer atomic mass units, said polymer having a probe tack value of at least 20 grams and having a 100% modulus of about 1 to 50 p.s.i.

16. A method according to claim 15 wherein said chain extender is water and wherein said prepolymer contains dialkylamino alkyl radicals at the ends of the pendant chains and is simultaneously chain extended and self-emulsified in an aqueous phase to provide an aqueous latex.

17. A latex comprising (I) a continuous aqueous phase, and (II) a film-forming, solid, isocyanate-free polymer having pressure-sensitive adhesive properties dispersed in said aqueous phase, said polymer when formed into a film having a 100% modulus of about 1–50 p.s.i., said latex resulting from substantially simultaneous emulsification and chain extension in said aqueous phase of an isocyanate terminated prepolymer containing at least 20% by weight pendant chains, from 5 to 15% by weight aromatic nuclei in the backbone, and dialkylamino alkyl radicals at the terminal portion of the pendant chains.

18. A latex according to claim 17 wherein 5–70% by weight of said latex is emulsified particles of said polymer.

19. A latex according to claim 17 wherein said dialkyl amino alkyl radicals have the formula

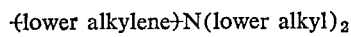

-(lower alkylene)-N(lower alkyl)$_2$

20. A latex according to claim 19 wherein said dispersed polymer is in the form of particles less than 1 micron in diameter.

21. An aqueous latex comprising a self-tackified, particulate, isocyanate-free polymer dispersed in a continuous aqueous phase, said polymer selected from the group consisting of polyurethane, polyurethane-polyurea, and polyurea polymers, said polymer having (a) at least 20% by weight pendant chains connected to branching sites in the backbone of the polymer, said backbone containing from 5 to 15% by weight aromatic nuclei based on total polymer weight, (A) said chains composed of atoms totaling 600–4000 atomic mass units, (B) said chains containing dialkyl amino alkyl radicals at the ends of said pendant chains, (b) a cross-link density of less than one cross-link per 4000 polymer atomic mass units, (c) said polymer when formed into a film having, (A) a probe tack value of at least 20 grams (B) a 100% modulus of about 1–50 p.s.i.

References Cited
UNITED STATES PATENTS

| Patent | Date | Name | Class |
|---|---|---|---|
| 3,012,993 | 12/1961 | Rogan | 260—77.5 MA |
| 3,350,361 | 10/1967 | Chandley et al. | 260—77.5 MA |
| 3,437,622 | 4/1969 | Dahl | 117—122 PA |
| 3,627,722 | 12/1971 | Seiter | 260—77.5 MA |
| 2,835,653 | 5/1958 | Hess et al. | 260—29.2 TN |
| 3,100,759 | 8/1963 | Boussv et al. | 260—77.5 AP |
| 3,264,134 | 8/1966 | Vill et al. | 260—29.2 TN |
| 3,410,817 | 11/1968 | McClellan et al. | 260—29.2 TN |
| 3,448,172 | 6/1969 | Damusis et al. | 260—77.5 MA |
| 3,479,310 | 11/1969 | Dietrich et al. | 260—29.2 TN |
| 3,491,050 | 1/1970 | Keberle et al. | 260—29.2 TN |
| 3,491,067 | 1/1970 | Sellet | 260—29.2 TN |
| 3,539,483 | 11/1970 | Keberle et al. | 260—29.2 TN |

PAUL LIEBERMAN, Primary Examiner

A. H. KOECKERT, Assistant Examiner

U.S. Cl. X.R.

117—122 P; 260—29.6 NR, 33.4 UR, 75 NQ, 77.5 AN, 77.5 AQ

UNITED STATES PATENT OFFICE
CERTIFICATE OF CORRECTION

Patent No. 3,796,678          Dated  March 12, 1974

Inventor(s) Dennis C. Bartizal

It is certified that error appears in the above-identified patent and that said Letters Patent are hereby corrected as shown below:

Column 4, line 9, correct the spelling of -- polymer -- ; and
    line 10, "types" should be -- type -- .

Column 6, line 18, "thioester" should be -- thioether -- .

Column 7, line 3, line up the parentheses preceding the formula, so the line begins -- (2) -- ;
    lines 9 and 10 are interchanged; line 10 should be moved ahead of line 9 so the text will read:
    -- In equation (2), Compound V is a poly(oxyalkylene) or polyester compound of low equivalent weight (e.g. about 500 to about 4000) or a mixture of such compounds having $\underline{f}$ or an ... -- ;
    line 42, change the last letter of the formula from "X" to -- Z -- ; and
    line 44, "$R_3$, $R_4$," should be -- $R^3$, $R^4$, -- .

Column 9, line 1, delete the phrase "e.g. alkanoic acids" which is repetitious (second occurrence);
    line 8, after "and/or" and before "poly(oxyalkylene)" insert -- a -- ; and
    line 54, change "of" to -- if -- .

Column 10, line 68, correct the spelling of -- caprolactam -- .
Column 11, line 64, insert -- (4) -- before the formula.

Column 12, line 12, enclose the figures in parentheses so it will read -- for Equations (1) - (3), -- .

Column 13, lines 56-66, after each entry in the column headed "DEEOA" insert -- g. -- , and
    lines 60-61, insert -- g. -- after "20.05" and "31.25".

UNITED STATES PATENT OFFICE
CERTIFICATE OF CORRECTION

Patent No. 3,796,678            Dated March 12, 1974

Inventor(s) Dennis C. Bartizal

It is certified that error appears in the above-identified patent and that said Letters Patent are hereby corrected as shown below:

Column 14, line 45 was omitted from the printed text.
　　Insert line 45 to read as follows:
　　-- Some representative values are given below: --
　lines 49 and 53, reference should be made to the footnote after "Example 1" and "7"; and
　lines 45 through 54, a wider space should be left between the two columns headed:

"Probe　　　　　　"Area of
　　　tack (g.)"　and　drawing, A-E".

Column 15, line 7, "14" should be -- 4 -- so it reads:
　　-- as in Examples 1-4 -- ;
　lines 21-32, a wider space should be left between the headings and the two columns headed:

"NCO/　　　　　"MDEOA/diluent
　　　OH"　　and　　(T = toluene)"; and lines 62-67, a wider space should be left between the headings and the two columns headed:

"Probe　　　　　　"Area of
　　　tack (g.)"　and　drawing (A-E)".

Column 17, line 35, change "standings" to -- standing -- ; and
　line 48, delete the hyphen so that the word reads -- prepolymer -- .

Column 17, line 73 (Claim 3, line 6), change "backbones" to -- backbone -- .

Signed and sealed this 5th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,796,678   Dated March 12, 1974

Inventor(s) Dennis C. Bartizal

It is certified that error appears in the above-identified patent and that said Letters Patent are hereby corrected as shown below:

Column 19, line 8 (in Claim 15, paragraph (1)(b) ), delete "[f-m(f-2)]".

Signed and Sealed this seventh Day of October 1975

[SEAL]

Attest:

RUTH C. MASON
Attesting Officer

C. MARSHALL DANN
Commissioner of Patents and Trademarks